Patented Feb. 1, 1949

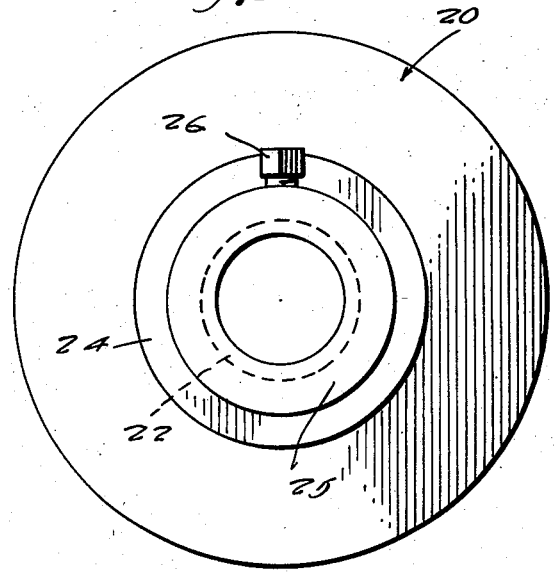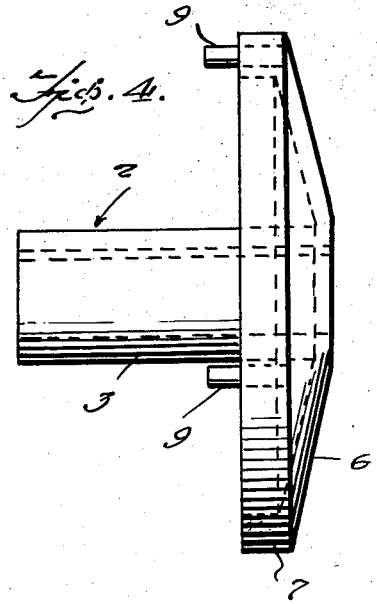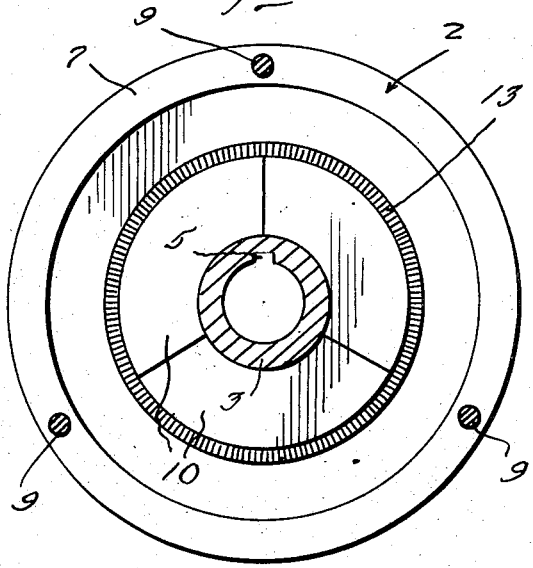

2,460,539

UNITED STATES PATENT OFFICE 2,460,539

CENTRIFUGAL CLUTCH

Eldon C. Shank, Freeport, Ill.

Application October 19, 1945, Serial No. 623,294

1 Claim. (Cl. 192—105)

This instant invention relates to centrifugal clutches and its primary object is the provision of a clutch which becomes operative when the speed has risen to a certain value.

Another object is the provision of a clutch of the character described which includes members moved by centrifugal force outwardly of the axis of rotation and also constrained to move axially to cause coaction between a friction plate slidable axially on and rotatable with the driving member and the driven member.

A still further object of the invention is the provision of a clutch of the character described which is of simple, durable and economical construction.

Other features of novelty which characterize my invention are pointed out with particularity in the claim annexed to and forming a part of this specification.

For a better understanding of my invention, however, and the advantages possessed by it, reference may be had to the following description taken in connection with the accompanying drawing, in which—

Figure 1 is an end view of the preferred embodiment of my invention,

Figure 2 is a diametral section,

Figure 3 is a transverse section on line 3—3 of Figure 2,

Figure 4 is a detail side elevation of the driving clutch member.

In the drawing in which like characters of reference designate like or similar parts, 2 denotes generally the driving clutch member, shown separately in Figure 4 and including a cylindrical sleeve portion 3 having in its inner or concave surface a longitudinal groove 5 to be occupied by a key (not shown) whereby such clutch member may be fixed upon the shaft of a prime mover such as the motor of a motorcycle.

Integral with or fixed to the right-hand end of the sleeve is a wall 6 the outer and inner surfaces of which represent frusta of cones and form an angle of about 15° with a plane normal to the axis of the sleeve. The wall which extends towards the left terminates at its periphery in a relatively short cylindrical flange 7 which is provided with a plurality, preferably three, of holes 8. Three guide rods 9 have each a press fit in one of the holes and extend beyond the left-hand end of the flange.

In the hollow or recess bounded by the inner surfaces of the conical wall and cylindrical flange are arranged a plurality, preferably three, of annular frusto-conical segments 10, the conical surfaces of which have the same inclination as the conical wall. A groove 12 is formed in the outer fragmentary cylindrical surfaces of these segments and occupied by a coil spring 13 fastened at its ends. The segments are preferably of cast iron.

Each guide rod 9 extends slidingly into a hole formed in and near the periphery of a friction plate 15 and disposed parallel to the axis of rotation of the driving clutch member 2. The right hand face of this plate 15 as adapted for engagement by the adjoining flat base faces of the segments 10. The plate 15 is also adapted for sliding motion upon the sleeve 3 of the clutch member 2. To the left-hand face of the plate 15 is secured by rivets 17 a circular piece of thick leather 18.

The left-hand free face of the leather 18 is adapted for frictional contact with the flat right-hand end face of a driven clutch member 20 which is centrally apertured for the insertion of a bronze bushing 22. The bushing 22 has a sliding fit upon the sleeve 3 of the driving clutch member 2 and is greased by an oiler or fitting in the end of the motor shaft (not shown) and receives the lubricant through a hole drilled through the clutch member sleeve 3 and one-half of the motor shaft.

Upon its left-hand face the driven member 20 carries a pulley 24 with a V-groove for a bolt (not shown).

Axial motion of the friction plate 15 and bronze bushing 22 is limited by a steel collar 25 having a radial tap for a set screw 26 which bears with its inner end against the sleeve.

Rotation of the driving clutch member 2 by the motor develops centrifugal forces which tend to move the segments 10 radially outwardly. As soon as the speed has reached such a value that the centrifugal forces developed thereby move the segments 10 radially against the resistance of the coil spring 13, these segments 10 are also moved axially to the left and against the plate 15 owing to the coaction of the inner conical surface of the wall 16 with the adjoining conical surfaces of the segments 10. The plate 15 which rotates always with the driving clutch member 2 is then displaced axially to the left and its leather face 18 engages the driven member 20 integral with the pulley 24 and rotates both.

The strength of the spring 13 determines the speed at which the clutch becomes operative.

I desire it to be understood that my invention is not limited to the particular construction shown and described, and I aim in the appended claim to cover all modifications which do not depart from the spirit of my invention.

What I claim as new, and desire to secure by Letters Patent of the United States is:

A clutch comprising a rotary driving housing having a sleeve adapted to be secured to a drive shaft, the said housing having a conical end wall, a plurality of centrifugal members in the housing and guided axially by the conical wall, a continuous annular groove extending around the upper portions of the centrifugal members, a coil spring in the groove biased to urge the centrifugal members inwardly toward the axis of the drive shaft, a friction plate mounted on the sleeve and slidable axially thereon, a pin secured to the inner rim of the housing and extending parallel to the axis of the drive shaft, a cooperating aperture in the friction plate to receive the pin to drive the friction plate along with the housing, and a driven member freely rotatable on the sleeve and adjacent the friction plate, whereby the centrifugal members when rotated will be guided by the conical wall to exert axial pressure on the friction plate to engage the latter with the driven member.

ELDON C. SHANK.

REFERENCES CITED

The following references are of record in the file of this patent:

UNITED STATES PATENTS

| Number | Name | Date |
|---|---|---|
| 1,004,047 | Lipe | Sept. 26, 1911 |
| 1,032,524 | Wiard | July 16, 1912 |
| 1,618,644 | Dickson | Feb. 22, 1927 |
| 1,682,493 | Ehrenfeld | Aug. 28, 1928 |
| 1,714,748 | Wright | May 28, 1929 |
| 2,260,796 | Burns | Oct. 28, 1941 |
| 2,368,299 | Hayter | Jan. 30, 1945 |